United States Patent [19]

Asano et al.

[11] 4,080,648
[45] Mar. 21, 1978

[54] MICRO PROGRAM CONTROL SYSTEM

[75] Inventors: Michio Asano, Kokubunji; Masato Yamagishi, Seto; Shoji Iwamoto, Tokyo; Shigeo Tsujioka, Kodaira, all of Japan

[73] Assignee: Hitachi, Ltd., Japan

[21] Appl. No.: 691,136

[22] Filed: May 28, 1976

[30] Foreign Application Priority Data

Jun. 6, 1975 Japan .................. 50-67644

[51] Int. Cl.² ............................................. G06F 9/06
[52] U.S. Cl. ................................................... 364/200
[58] Field of Search ................ 340/172.5; 445/1; 364/200 MS, 900 MS

[56] References Cited

U.S. PATENT DOCUMENTS

| 3,389,376 | 6/1968 | Packard | 340/172.5 |
| 3,585,605 | 6/1971 | Gardner et al. | 340/172.5 |
| 3,685,020 | 8/1972 | Meade | 340/172.5 |
| 3,736,563 | 5/1973 | Beckinger et al. | 340/172.5 |
| 3,930,236 | 12/1975 | Ferguson et al. | 340/172.5 |

Primary Examiner—Harvey E. Springborn
Attorney, Agent, or Firm—Craig & Antonelli

[57] ABSTRACT

A micro program control system for use in a data processing system includes a subsidiary control memory for storing the first micro instructions of respective micro programs, and a control memory for storing the second and the remaining micro instructions of the respective micro programs. The subsidinary control memory is coupled to a main memory in which macro instructions of a program for the data processing system are stored. The operation code of the macro instruction includes a code to address the first micro instruction in the subsidiary control memory, so that one of the first micro instructions can be accessed to supply into a control register when the macro instruction is read out from the main memory to an instruction register of the data processing system, whereby control signals for controlling the operation of the data processing system are delivered from the control register according to the contents of the first micro instruction. The second and necessary number of the remaining micro instructions in the control memory are fetched, in turn, into the control register according to the operation code of the macro instruction held in the instruction register and the contents of the preceding micro instruction in the control register, whereby a micro program corresponding to the macro instruction is performed.

5 Claims, 7 Drawing Figures

MICRO PROGRAM CONTROL SYSTEM

BACKGROUND OF THE INVENTION

This invention relates to a micro program control system for use in a data processing system, and more particularly to a micro program control system having a speeded-up control operation.

A conventional data processing system of a micro programmed type includes a main memory for storing data and macro instructions by which a data processing program is constructed, an instruction register for holding a macro instruction read out from the main memory, a plurality of registers for holding data temporarily, an arithmetic and logical circuit unit ALU for data processing, and a fast accessible control memory for storing a plurality of micro programs, each of which comprises different micro instructions arranged in sequence, with each including a control code to control the data processing system.

The macro instructions, each comprising an operation code and operand information, for instance, are stored in a main memory and are sequentially read out to the instruction register through the execution of a proper one of these micro instructions. One of the micro programs is selected in response to the macro instructions according to the operation of the micro program control register. In the previously known control system, the operation code of the certain macro instruction is decoded in order to specify the address of a first micro instruction of the desired micro program corresponding to the macro instruction. After this decoding step, the first micro instruction is read out from the control memory and executed.

The first micro instruction also includes the next address information and an address selection code so that it can specify a second micro instruction to be executed at the second micro operation. The second micro instruction is similarly arranged so that it can specify a next micro instruction. Therefore, all of the micro instruction in the micro program, in turn, can be accessed and executed. The last micro instruction of each micro programs includes information for fetching the next macro instruction, thereby advancing the programmed processing.

Therefore, it is desired to execute the first micro instruction of the next micro program as fast as possible after the completion of the execution of the last micro instruction, of the certain micro program in order to speed up the operation of the data processing system. However, it takes a long time for the decoding of the macro instruction in order to specify the address of the first micro instruction of each micro program in the above micro program control system.

SUMMARY OF THE INVENTION

It is therefore an object of the present invention to provide an improved micro program control system by which the data processing system can operate at a higher speed.

It is another object of the present invention to provide a micro program control system wherein addressing of the first micro instruction of the respective micro programs can be finished in the reading out cycle of the macro instruction from the main memory.

In accomplishing these and other objects in accordance with the present invention, the micro program control system includes a control memory and a subsidiary control memory, such as a read only memory, for storing micro programs. The subsidiary control memory is exclusively used to store all of respective first micro instructions in the respective micro programs. The micro instructions with the exception of the first micro instructions of the respective micro programs are stored in the control memory in which micro instructions of a console control program are also stored.

Macro instructions are stored in a main memory, to which the subsidiary control memory is coupled. The first one of the macro instructions is read out from the main memory, in an initial state, by the console control program stored in the control memory. The operation code of the macro instruction includes a code to address the first micro instruction of the subsidiary control memory, so that it is able to specify directly one of the first micro instructions corresponding to the operation code of the macro instruction when the macro instruction is read out from the main memory to an instruction register coupled thereto. As a result, the first micro instruction accessed by the operation code of the macro instruction can be applied to a control register as soon as the macro instructon is fetched into the instruction register, so that control signals represented by the control code of the first micro instruction are immediately delivered from the control register to the data processing system. The macro instruction held in the instruction register is decoded to address a second micro instruction stored in the control memory, corresponding to the macro instruction.

After the execution of the first micro instruction, the micro program control memory operates to access the second micro instruction according to the addressing of the instruction register, so thatthe second micro instruction is applied to the control register to deliver control signals therethrough.

The third and the remaining micro instructions stored in the control memory are accessed one after another according to an address information and an address selection code of the preceding, micro instruction as have been described above. Control operations designated by the macro instruction are, therefore, implemented through the execution of a micro program constituted by the first micro instruction read out from the subsidiary control memory and the micro instructions read out from the control memory.

The last micro instructions of the micro program includes a control code for fetching the next macro instruction from the main memory, so that data processing is performed according to the program of the macro instructions.

The subsidiary control memory of the present invention can use a read only memory having a small memory capacity because the number of first micro instructions to be stored in the subsidiary control memory is up to several tens. Furthermore, another embodiment of the present invention will be explained hereinafter. If these first micro instructions include the same binary contents at some bit positions, the bits having the same binary contents do not have to be stored in the subsidiary control memory. As a result, the capacity of the subsidiary control memory can be small. In order to reproduce the contents of the omitted bits, a particular micro instruction, which comprises some bits including the contents of the same bits omitted from the first micro instruction and the remaining bits having a zero value, the defective portions of the respective binary bits configuration is prepared in the control memory.

This particular micro instruction is read out from the control memory whenever one of the first micro instructions is delivered from the subsidiary control memory to the control register. The particular micro instruction and one of the first micro instructions are logically combined with each other in each corresponding bit position by wired OR logic connections whereby the micro instruction having the original binary bits pattern is reproduced.

The foregoing and other objects, advantages, manner of operation, and features of the present invention will become apparent from the following detailed description when read in connection with the accompanying drawings.

DESCRIPTION OF THE PRIOR ART

The basic formats of a macro instruction will be explained first to aid in understanding the present invention.

For the macro instruction, various types of instruction formats are prepared to perform the programmed operations effectively. Each macro instruction may be considered to comprise two main fields, one of which provides an operation code for indicating the type of operation to be effected and the other of which provides information as to the operands. The latter includes further fields, each having a different definition according to the type of macro instruction.

Figure 1:
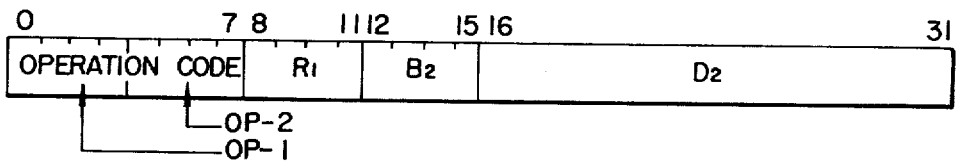
FIG. 1 is a diagram showing the fundamental formats of a macro instruction in the prior art.

Referring to FIG. 1 three typical macro instruction formats are shown therein. For the convenience of the explanation, these instruction formats are named type-1, type-2, and type-3, respectively. Each operation code comprises eight bits from bit position 0 to bit position 7 of respective macro instructions. The operation code includes two sub-fields, each of which consists of four bits as represented by symbols OP-1 and OP-2. The first field OP-1 of the operation code indicates the type of the instruction format. The second field OP-2 of the operation code designates the type of operation, for example, addition, subtraction, and other logical operations, to be performed in an arithmetic and logic operation unit ALU of the data processing system. As will be described in FIG. 2 hereinafter, the data processing system includes a general purpose register for temporarily storing operands. The general purpose register comprises a plurality of register portions. In this system, these register portions are designated by symbols GR(0), GR(1) GR(N) corresponding to 0, 1, 2, N bit positions of the general purpose register.

The type-1 macro instruction, which are two bytes in length, perform data processing between the first operand stored in the register position GR(1) of the general purpose register and the second operand stored in the main memory. The address of the second operand in the main memory is given by the sum of the contents of the register portion GR(0) and IRL, wherein IRL is sixteen bits in length, and in which eight zero bits are positioned in bit positions 0 to 7 and the contents of the $D_2$ field, which comprises eight bits in bit positions 8 to 15 of the macro instruction are located in bit positions 8 to 15.

The type-2 macro instruction, which is two bytes in length, performs data processing between the first and second operands in the general purpose register $GR(R_1)$ and $GR(R_2)$ appointed by the contents of the $R_1$ and $R_2$ field thereof, respectively.

The type-3 macro instruction is four bytes in length and performs data processing between the first operand in the general purpose register $GR(R_1)$ appointed by the contents of the $R_1$ field thereof and the second operand stored in the main memory. The address position of the second operand is given by the sum of the contents of the general purpose register $GR(B_2)$ appointed by the $B_2$ field of the macro instruction and of the $D_2$field of the macro instruction. The $D_2$ field comprises sixteen bits in bit positions 16 to 31 bit position of the macro instruction.

Figure 2:
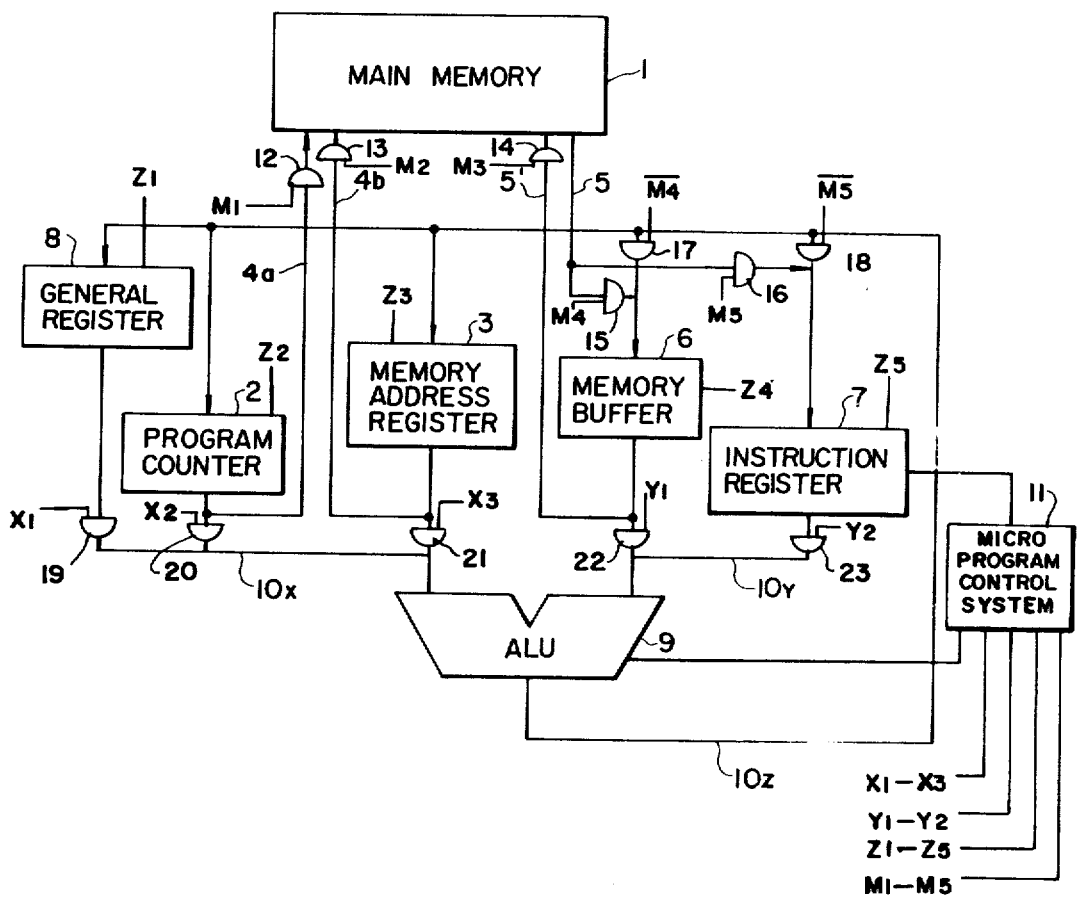
FIG. 2 is a schematic block diagram of a data processing system in the prior art, wherein the micro program control system according to the present invention is applied.

In FIG. 2 there is shown a simplified block diagram of a data processing system according to the prior art, in which the micro program control system 11 in accordance with the present invention is applied, wherein reference numeral 1 represents a main memory for storing the macro instructions described above and necessary data therein. The contents of the main memory 1 are accessed by the contents of a program counter 2 or a memory address register 3 via address lines 4a and 4b and gates 12 and 13. The macro instruction is read out to an instruction register 7 via data lines 5 and a gate 16, and the necessary data is read out to a memory buffer register 6 via the data lines 5 and a gate 15. The contents of the memory buffer register 6 is transferred to the main memory 1 through data line 5'. A general purpose register 8 includes a plurality of register portions, for example, sixteen register portions GR(0) - GR(15).

The respective contents of the program counter 2, the memory address register 3, and the general purpose register 8 are selectively input through gate circuits19, 20, and 21 and data bus 10x into the arithmetic and logic unit (ALU) 9. On the other hand, the contents of the memory buffer register 6 and the instruction register 7 are selectively transferred to the arithmetic and logic circuit unit 9 via gates 22 and 23 and data bus 10y. The output of the ALU, which appears on data bus 10z, is transferred to one of the registers 2, 3, 6, 7, and 8 selected by the control signals $Z_1$ through $Z_5$ from the micro program control system, wherein the output of the ALU is applied to the register 6 via a gate 17 and to the register 7 via a gate 18. Although it is not shown in FIG. 2, the micro instruction control system 11 includes a decoder coupled with the instruction register 7, a control memory for storing all of the micro instructions of respective micro programs, addressing means for addressing the micro instructions in the control memory, and a control register for holding the micro instruction read out from the control memory. The address of the first micro instruction of a micro program is supplied by the decoder according to the operation code of the macro instruction held in the instruction register. The address of the other micro instructions, with the exception of the first micro instruction, of the micro program are determined by the preceding micro instruction. When one of these micro instructions is read out from the control memory into the control register, several types of control signals are delivered from the control register according to the contents of the micro instruction.

One of the control signals controls the operation of the arithmetic and logical circuit unit ALU. Control signals $X_1$ through $X_3$ are supplied to the gates 19 through 21, selectively. Control signals $Y_1$ and $Y_2$ are supplied to the gates 22 and 23, selectively. Control signals $Z_1$, $Z_2$, $Z_3$, $Z_4$, and $Z_5$ operatively control the registers 2, 3, 6, 7, and 8, respectively. Control signals $M_1$ through $M_5$ are supplied to the gates 12 through 16, selectively. The gates 17 and 18 are controlled by the control signals $\overline{M_4}$ and $\overline{M_5}$, which are inverted signals of $M_4$ and $M_5$, respectively. This type of data processing system without the micro program control system is of a conventional nature and its detailed operation is known to those skilled in the art.

DESCRIPTION OF THE PREFERRED EMBODIMENT

When one of macro instructions is read out from the main memory, a micro program corresponding to the macro instruction is selected and executed under the control of the micro program control system. Most of micro programs comprise a micro operation sequence for operand fetching and a sequence for arithmetic or logical operations. The sequences to be executed depend on the contents of the operation code field OP-1 and OP-2 of the respective macro instructions.

Figure 3:
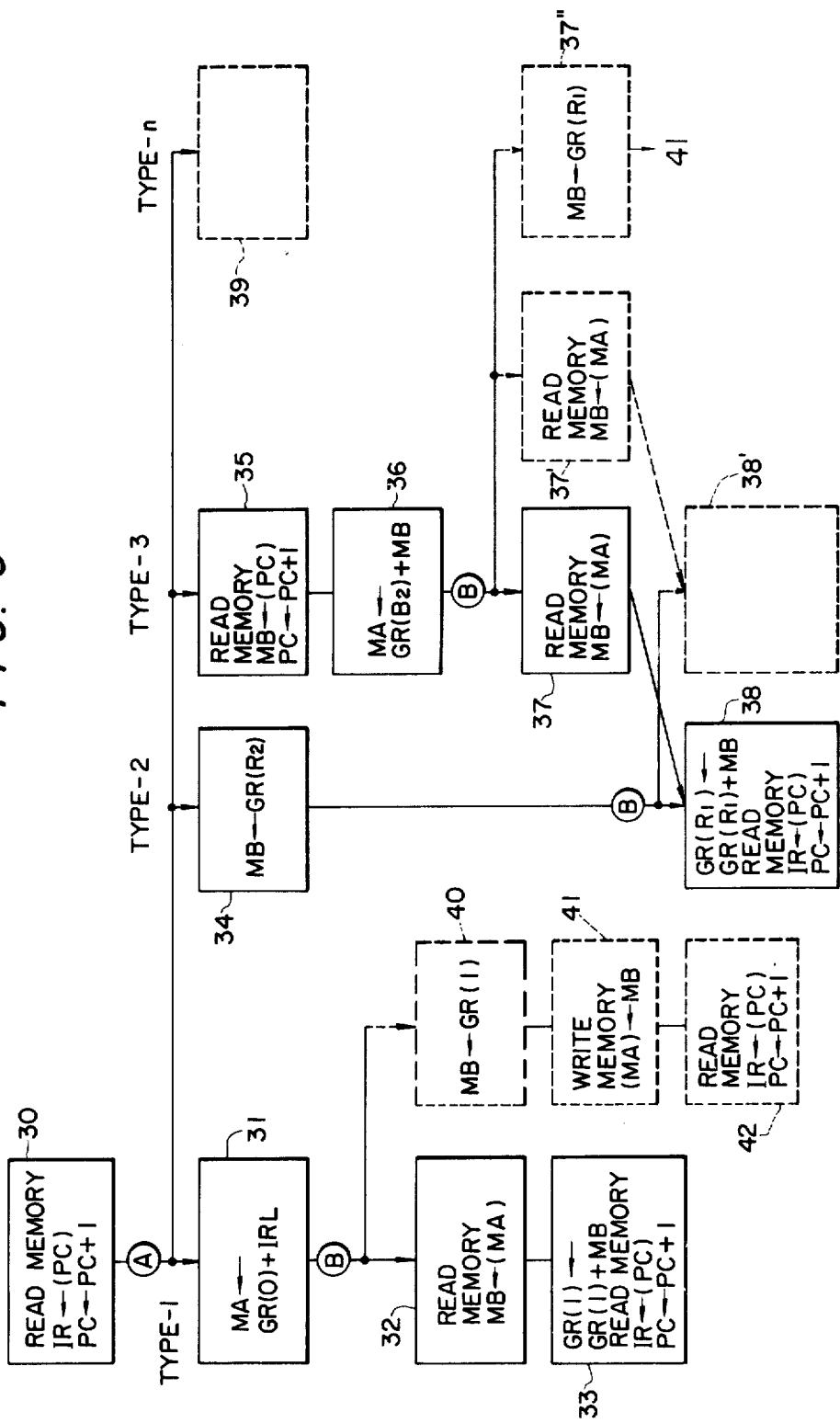
FIG. 3 is a schematic diagram showing the typical combinations and sequences of the micro instructions in the micro programs.

Referring to FIG. 3 several sequences of micro instructions are illustrated, wherein symbols PC, MA, MB and IR are identical to the program counter 2, the memory address register 3, the memory buffer 6 and the instruction register 7, previously shown in FIG. 2, respectively. The first macro instruction is obtained from the main memory and applied to the instruction register IR through the execution step of a micro instruction 30. This micro instruction 30 indicates that the address of the macro instruction is appointed by the contents of the program counter PC, and that the content of the program counter PC is incremented when the macro instruction retrieval operation is carried out.

After the program retrieval operation, the micro program control system selects the first micro instruction according to the contents of the OP-1 field of the macro instruction among the micro instructions 31, 34, 35, and 39 in FIG. 3, for example. The detailed description of the micro program control system will be made hereinafter. The micro instruction 31 is executed when the macro instruction has a format of type-1 format, whereby a memory address of the second operand is calculated and the result of GR(0) + IRL is inputted to the memory address register MA. The first micro instruction 34 is executed when the macro instruction is of a type-2 format, so that the first operand stored in the register portion GR($R_2$) of a general purpose register is transferred to the memory buffer register MB.

When the type-3 macro instruction is retrieved, memory accessing is necessary once more thereafter, because this type of instruction is four bytes in length while the others are two bytes in length. This operation is executed through the micro instruction 35, whereby the $D_2$ field of the macro instruction is read out from the main memory addressed by the program counter PC to the memory buffer register MB. The contents of the memory buffer register MB is then added to the contents of a GR($B_2$) portion of the general purpose register by the next micro instruction 36, so that an address information appointing the address of the first operand is applied to the memory address register MA.

The micro instruction 39 illustrated by a vacant block represents one of the micro instructions to be executed in any one of the micro programs when a macro instruction having a type other than type-1, type-2, or type-3 is read out from the main memory.

After the execution of one of these first micro operations, the micro program control system effects the selection of the second micro operation sequence according to the contents of the operation code of the macro instruction. These selections occur at points B in FIG. 3. For example, if the macro instruction is of a type-1 format and the contents of the OP-2 field represent an add operation, a micro instruction 32 is selected as the second micro instruction through the execution of the micro instruction 31, so that the second operand stored in the main memory at an address designated by the content of the memory address register MA is applied to the memory buffer register MB. The micro instruction 32 includes information designating the address of the third micro instruction 33. By means of the micro instruction 33, the contents of the memory buffer register MB is added to the contents of register portion GR(1) of the general purpose register. Concurrently with this micro operation, another micro operation for fetching the next macro instruction is executed by the micro instruction 33, whereby the program execution is advanced.

In the case of an add instruction of a type-2 format, micro instruction 38 is selected, by which an add operation is performed between the contents of the memory buffer register MB and the contents of the GR($R_1$) portion of the general purpose register. If the contents of the OP-2 field of the macro instruction represents an operation other than an add operation, a micro operation 38′ corresponding to the contents of the macro instruction, should be selected after the micro instruction 34.

In the case of the type-3 macro instruction, a micro instruction 37 is executed following the micro instruction 36, and the contents of the main memory are applied to memory buffer register MB from the address specified by the memory address register MA. Since this micro instruction 37 includes address information designating the address of the micro instruction 38, an add operation is effected at the next step of the operation, similarly as in the case of the type-2 macro instruction. If a micro instruction 37′ which can designate the address of the micro instruction 38′ is selected, the micro instruction 38′ will be executed instead of the micro instruction 38 after the micro instruction 36.

A micro operation sequence consisting of micro instructions 40, 41, and 42 is prepared for the store instruction. The store instruction operate to store the first operand to an address specified by the second operand. In this sequence, the contents of the register portion GR(1) of the general purpose register, which is the first operand, is transferred to the memory buffer register MB by the micro instruction 40 after the execution of the first micro instruction 31. The contents of the memory buffer register MB is stored in the main memory at the address designated by the memory address register MA. At the last step, the micro instruction 42 is executed in order to retrieve next macro instruction. The store operation is also required for a type-3 macro instruction, as shown by a micro instruction 37''.

Although a small number of micro instructions have been illustrated in FIG. 3 for convenience of explanation, it should be understood that various other kinds of micro instructions will be prepared in actual practice in order to implement the complex operations. According to the present invention, the first micro instructions, such as the micro instructions 31, 34, 35, and 39 in FIG. 3, one of which is executed just after the macro instruction retrieval, are stored in the subsidiary control memory and the other micro instructions, excepting these first micro instructions, are stored in the conventional control memory as described as follows.

Figure 4:
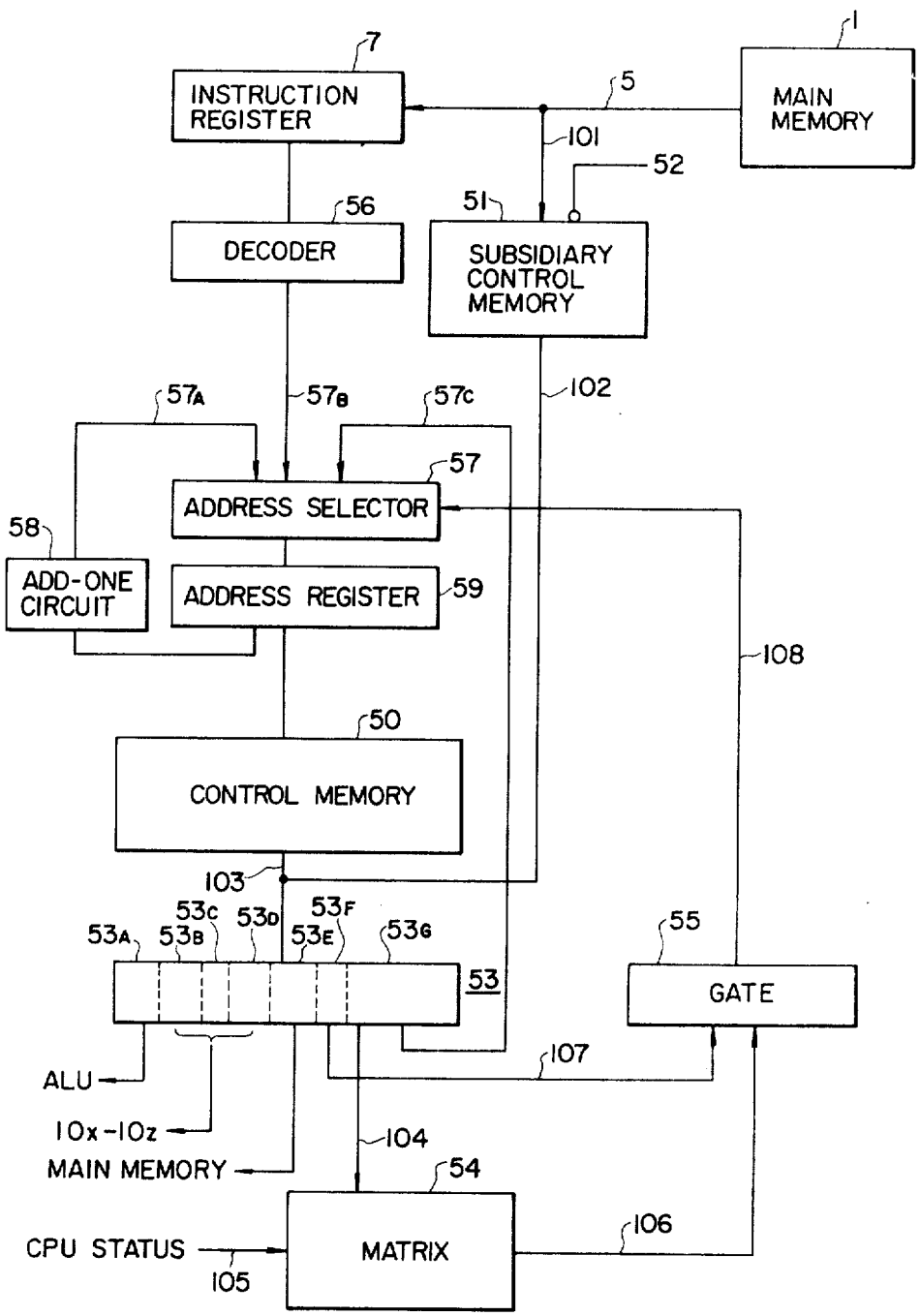
FIG. 4 is a block diagram showing an example of the micro program control system according to one embodiment of the present invention.

Referring now to FIG. 4, there is shown an illustrated embodiment of the micro program control system of the present invention. The macro instructions stored in the main memory 1 are read out one after another to the instruction register 7 over data lines 5 which are also connected to the memory buffer register (not shown in FIG. 4). The data lines 5 include a plurality of wires corresponding to the number of bits of the macro instruction, though it is illusltrated as a single line for the purposes of drawing simplicity. The address lines 101 of the subsidiary control memory 51, in which the first micro instructions are stored, are coupled to a portion of the data lines 5, so that one of the first micro instructions is specified in accordance with the contents of the OP-1 field of the macro instruction on the data lines 5. The first micro instruction thus specified is applied to a control register 53 over lines 102 by supplying an enable signal to an enable terminal 52 of the memory 51. The enable signal is provided in synchronism with the read out of the macro instruction. A conventional read only memory may be utilized for the subsidiary control memory 51.

The micro instruction stored in the control memory 50 is read out to the control register 53 over lines 103. The lines 102 and the lines 103 are associated with each other by corresponding bits to form wired OR configurations thereat. Each of the micro instructions consists of a plurality of code fields, for example 53A - 53G. The control register 53 operates to distribute control signals corresponding to the contents of the respective code fields of the micro instruction held therein.

The bit arrangement of the micro instruction, that is, the digital contents of the control register, includes a plurality of fields. In this embodiment, the contents of the field 53A represents the type of operations, according to which the arithmetic and logic circuit unit ALU is controlled. The contents of the fields 53B, 53C, and 53D serve to control the data transfer between the registers and ALU through the data buses 10x, 10y and 10z shown in FIG. 2, respectively. The field 53E includes a control code to control the main memory accessing. The contents of the field 53F includes an address selection code, according to which the selection of next micro instruction is decided. The address selection code represented by the contents of the field 53F is transferred to the address selector 57 through a gate circuit 55 over lines 107 and 108. The contents of the field 53G represents an address in the control memory 50. A portion of the field 53G may be used to represent a test condition code when the contents of the field 53F instructs to branch according to the result of a condition test. The test condition code is supplied to a matrix circuit 54 over lines 104. To the matrix circuit 54, status signals representing the status of CPU are also supplied via lines 105, so that a selected one of these status signals matched to the test condition code is delivered from the matrix circuit 54 and supplied to the gate circuit 55 over lines 106.

The address selector 57 selects one address out of three address signals provided by lines 57A, 57B, and 57C according to the address selection code, thereby to set an address signal into an address register 59 connected thereto. The lines 57A transfer a sequential address supplied by an add-one circuit 58, which operates to successively increment the address provided by the address register 59. The lines 57B transfer an address supplied by a decoder 56 coupled to the instruction register 7. The decoder 56 decodes the contents of the operation code of the macro instruction held in the instruction register, so that an address designating the second micro instruction to be executed at points B in FIG. 3 is delivered therefrom. The lines 57C transfer an address represented by the contents of the address field 53G of the control register 53.

In this micro program control system, the enable signal for the subsidiary control memory 51 is issued in the execution step in which a micro instruction is executed for retrieving the macro instruction. As a result, one of the first micro instructions to be executed just after the retrieval of the macro instruction is applied to the control register 53 as soon as the retrieved macro instruction appears on the data lines 5. The second and the remaining micro instructions to be executed following the first micro instruction are addressed in turn by the address register 59, and read out from the control memory 50 to the control register 53, thereby to complete the operation of a micro program corresponding to the macro instruction.

According to the present invention, the subsidiary control memory 51 may store partial contents of respective first micro instructions in order to reduce the memory capacity required for the read only memory as follows.

TABLE-1

| Bit No. No. of bits | ALU Operation 1-3 3 | Signal Transfer Control | | | Main Memory Access Control 12-13 2 | Destination 14 1 | Next Address Selection 15-16 2 | Address (Test Condition) 17-24 8 |
|---|---|---|---|---|---|---|---|---|
| | | (X-bus) 4-6 3 | (Y-bus) 7-8 2 | (Z-pass) 9-11 3 | | | | |
| Value | | | | | | | | |
| 0 | Zero | φ | φ | φ | φ | IR | Sequential | |
| 1 | Y−X | GR(R₂) | MB | PC | Read (MA) | MB | OP-code branch | |
| 2 | X−Y | GR(B₁) | IRL | IR | Read (PC) PC+1 | | Unconditional | |
| 3 | X+Y | GR(R₁) | | GR(R₁) | Write | | Test | |
| 4 | Y | GR(0) | | GR(R₂) | | | | |
| 5 | Y | GR(1) | | GR(1) | | | | |
| 6 | X | MA | | MA | | | | |

TABLE-1-continued

| Bit No. No. of bits | ALU Operation 1-3 3 | Signal Transfer Control | | | Main Memory Access Control 12-13 2 | Destination 14 1 | Next Address Selection 15-16 2 | Address (Test Condition) 17-24 8 |
|---|---|---|---|---|---|---|---|---|
| | | (X-bus) 4-6 3 | (Y-bus) 7-8 2 | (Z-pass) 9-11 3 | | | | |
| 7 | X̄ | PC | | MB | | | | |

Referring now to table-1, a simplified bit arrangement of the micro instruction comprising twenty-four bits is illustrated, wherein eight groups of bits represented by bit No. 1 - 3 to 17 - 24 correspond to the code fields from 53A through 53G in FIG. 4, respectively. It is because of explanatory simplicity that the operation code field 53A includes only three bits in this arrangement.

In the column of bit No. 1-3, several types of arithmetic operations, that is, operation results on the data bus 10z (Z-bus), are shown according to the value of the operation code. For example, the designation Zero represents no operation; the designations $Y-X$, $X-Y$ and $X+Y$ represent binary subtraction or addition between information on the data buses 10x (X-bus) and 10y (Y-bus), respectively; the designations Y and X represent the transfer of the information on the Y-buses and X-buses, respectively; and the designations $\bar{Y}$ and $\bar{X}$ represent the transfer of the inverted result of the information on the Y-buses and X-buses, respectively.

In the columns of bit No. 4-6, 7-8, and 9-11, the type of registers to be coupled with the X-buses, Y-buses, and Z-buses through gate operation are shown, respectively. The column of bit No. 12-13 shows the type of main memory access control, wherein designation Read (MA) indicates reading out of data from the address appointed by the memory address register; and the designation Read (PC) indicates a reading out of data from the address appointed by the program counter.

The column of bit No. 14 shows the destination register to which data is transferred from the main memory. The column of bits No. 15-16 shows the type of address selection. The designation "Sequential" indicates to select a sequential address on the lines 57A; the designation "OP-code Branch" indicates an address on the lines 57B; the designation "Unconditional" indicates an address part on the line 57C unconditionally; and the designation "Test" indicates the selection of an address part on the lines 57C when the specified test condition coincides with the result of the arithmetic operation performed by the CPU. If the test condition is not satisfied, the sequential address is selected.

The remaining eight bits positioned at bit No. 17-24 constitute an address field corresponding to the field 53G in the control register, which represents the address of the micro instruction to be executed at the next step.

According to the code definition shown in Table-1, the first micro instructions 31, 34, and 35 should have such binary bit arrangements as shown in Table-2. Since the second micro instruction is specified by the decoded result of the operation code of the macro instruction, the address fields of the first micro instructions 31 and 34 have no contents. The micro first instruction 35 has address contents designating the address of the second micro instruction 36.

It will be understood by referring to Table-2 that all of the first step micro instructions 31, 34, and 35 include the same binary value "1" or "0" at four bit positions 5, 8, 13, and 16, and unique binary values at the other twenty bit positions, respectively. In this case, these first micro instructions may be shortened in length for storage in the subsidiary control memory by omitting such same bits positioned at 5, 8, 13, and 16.

TABLE-2

| Bit No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|
| Micro Instruction No. 31 | 0 | 1 | 1 | 1 | 0 | 0 | 1 | 0 | 1 | 1 | 0 | 0 | 0 | 0 | 0 | 1 | 0 | 0 | 0 | 0 | 0 | 0 | 0 | 0 |
| 34 | 1 | 1 | 0 | 0 | 0 | 1 | 0 | 0 | 1 | 1 | 1 | 0 | 0 | 0 | 0 | 1 | 0 | 0 | 0 | 0 | 0 | 0 | 0 | 0 |
| 35 | 0 | 0 | 0 | 0 | 0 | 0 | 0 | 0 | 0 | 0 | 1 | 0 | 1 | 1 | 1 | 1 | ( | | | 36 | | | | ) |
| X | 0 | 0 | 0 | 0 | 0 | 0 | 0 | 0 | 0 | 0 | 0 | 0 | 0 | 0 | 0 | 1 | 0 | 0 | 0 | 0 | 0 | 0 | 0 | 0 |

When the first micro instructions thus shortened in length are stored in the subsidiary control memory 51, a particular micro instruction as shown by designation X in Table-2 should be stored at a predetermined address of the control memory 50. The particular micro instruction includes binary values omitted from the first step micro instruction at bit positions 5, 8, 13, and 16, and a zero value at the remaining bit positions. This micro instruction X is read out from the control memory 50 in synchronism with respective reading out of the first micro instruction 31, 34, or 35 in the subsidiary control memory 51. Both of the micro instruction X and one of the first micro instructions are associated with each other in each corresponding bit position thereof on lines 103, so that a micro instruction including the original full length binary pattern is reproduced.

Figure 5:
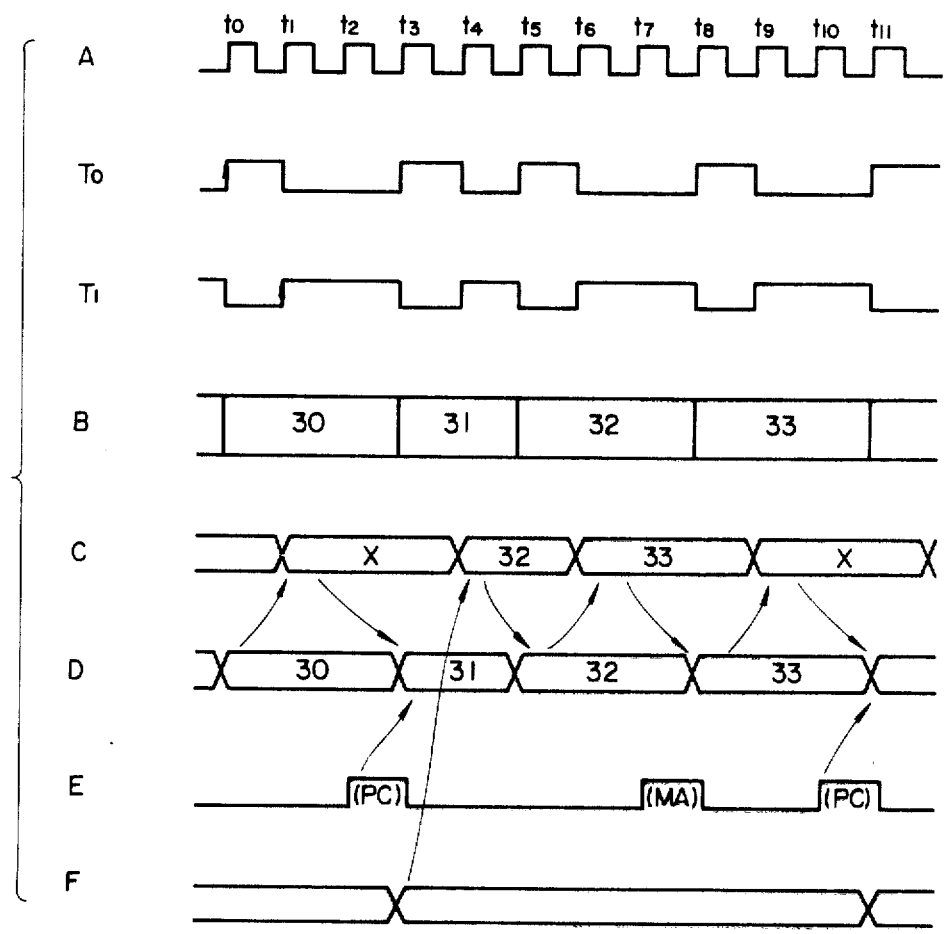
FIG. 5 is a timing chart which is used to explain the operation of the control system shown in FIG. 4.

Referring to FIG. 5, showing a timing chart, description will be made of the control sequence taking a micro program which includes micro instruction 31, 32, and 33 as an example.

In FIG. 5, line A shows clock pulses produced at time $t_0$, $t_1$, $t_2$, and so forth. Lines $T_0$ and $T_1$ in FIG. 5 show timing signals for data setting to the control register 53 and to the address register 59, respectively. These data setting operations are carried out at the rising or leading edge of the respective timing pulses $T_0$ and $T_1$. Line B shows a sequence of micro instructions to be executed. Lines C and D show the contents of the address register 59 and the control register 53, respectively. Line E shows information read out from the main memory of on the data lines 5. Line F shows macro instructions held in the instruction register 7.

At time $t_0$, the first micro instruction 30 is set into the control register 53. This micro instruction 30 includes an operation code to retrieve a macro instruction specified by the program counter PC and address information appointing the address of the micro instruction X. Therefore, the address of the micro instruction X, as shown in line C of FIG. 5 by the first arrow, is transferred to the address register at time $t_1$. Although the operation for retrieving the macro instruction begins at time $t_0$, it requires a relatively long time to complete the memory accessing, so that both the timing signals $T_0$ and $T_1$ are left as they are at time $t_2$.

An enable signal for the subsidiary control memory 51 is sent out from the control register 53 during the operation step of the micro instruction 30. Accordingly, when the macro instruction appears on the data lines 5, a binary pattern corresponding to the first micro instruction 31 is produced on data lines 102 even though the macro instruction retrieval cycle is not completed. This binary pattern and the contents of the micro instruction X are combined logically to reproduce a full length first micro instruction on the lines 103, whereby the next micro instruction 31 is applied to the control register at time $t_3$.

The address information to be applied to the address register 59 at time $t_4$ is specified through the decoding of the operation code of the macro instruction held in the instruction register. This address transfer is indicated by an arrow from line F toward line C in FIG. 5. Addressed by the contents of the address register, the next micro instruction 32 is read out from the control memory 50 into the control register 53 at time $t_5$.

The micro instruction 32 includes address information designating the address of the third micro instruction 33. This address is transferred to the address information register at time $t_6$. The micro instruction 33 is read out to the control register at time $t_8$.

The micro instruction 33, which is the last step micro instruction of this sequence, executes not only the arithmetic operation but also the retrieval operation of the next macro instruction. Therefore, the micro instruction 33 includes address information designating the address of the micro instruction X. It will be apparent that a next first micro instruction required for the first step of the next micro program is also specified in the execution step of the micro instruction 33 in a similar fashion to the micro instruction 30 described hereinbefore.

Figure 6:
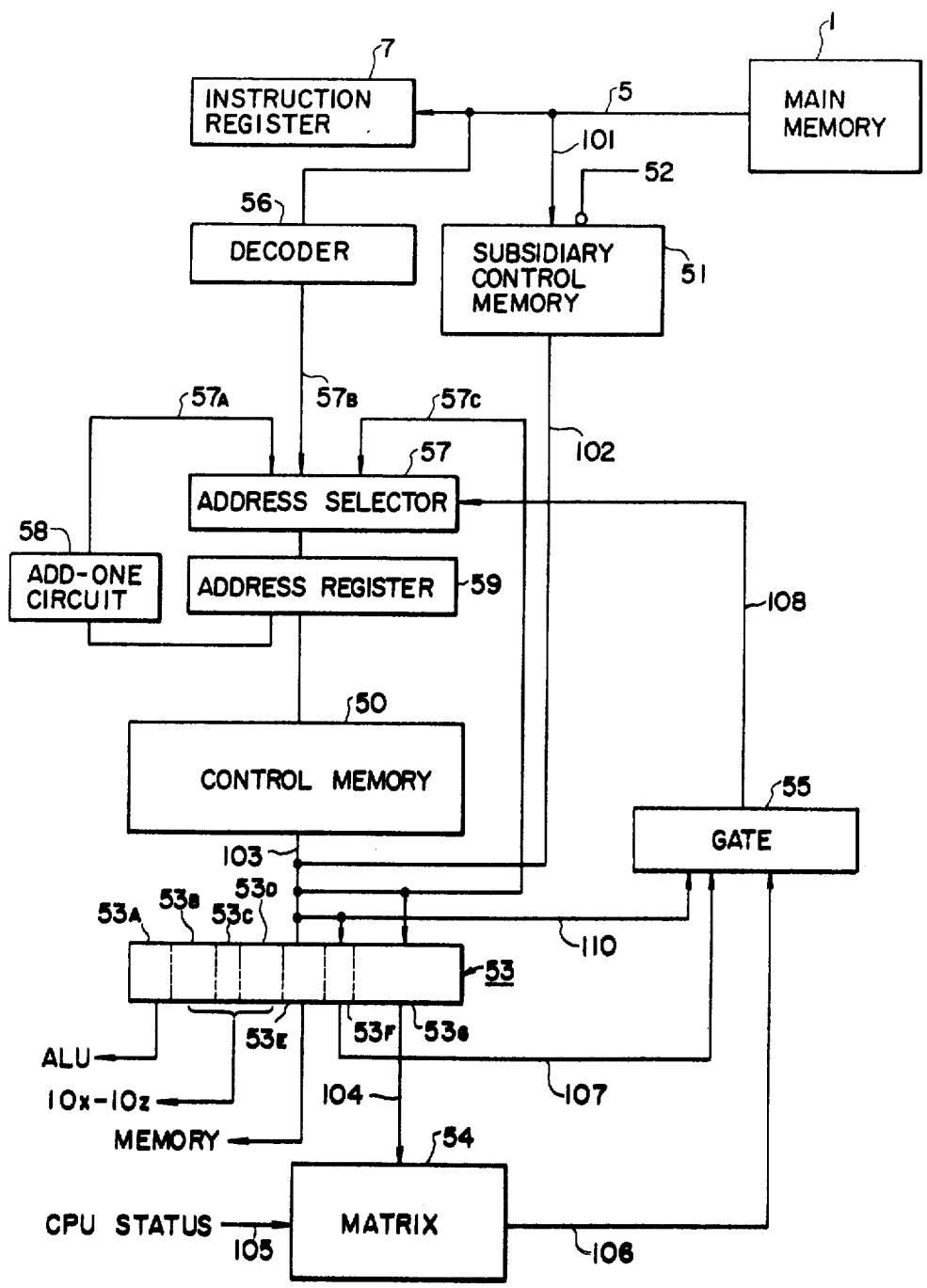
FIG. 6 is a block diagram showing a construction of the micro program control system according to another embodiment of the present invention.
Figure 7:
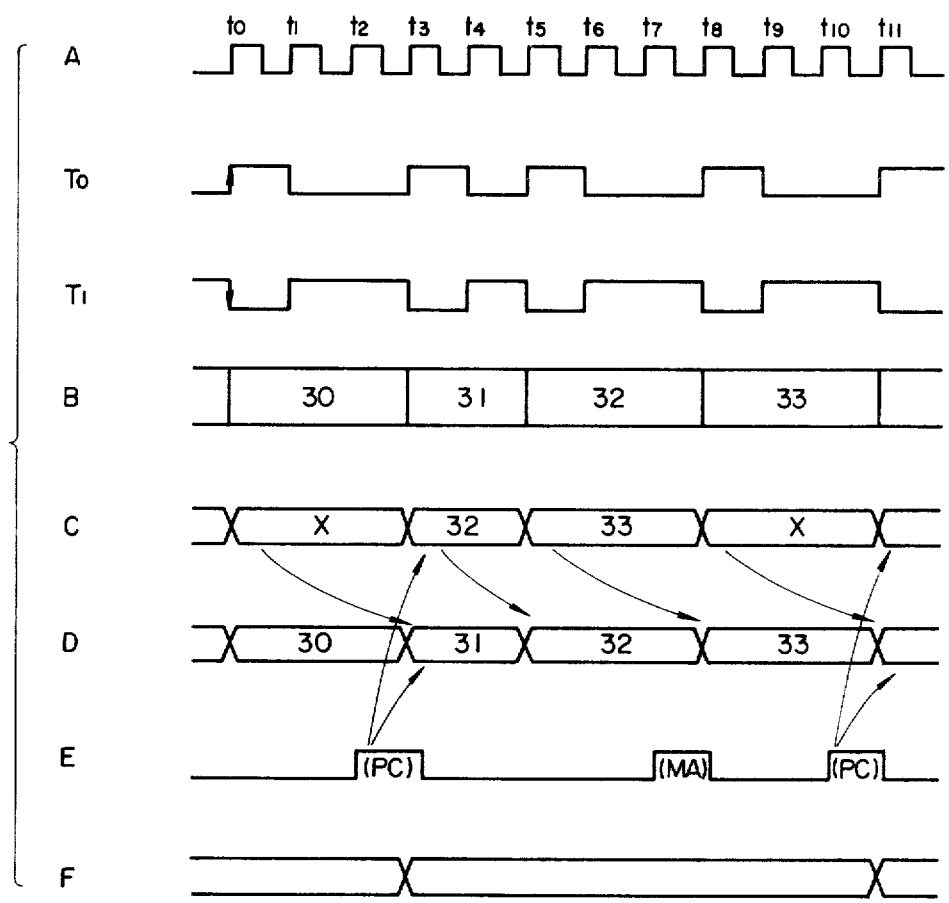
FIG. 7 is a timing chart which is used to explain the operation of the control system shown in FIG. 6.

FIG. 6 shows another embodiment of the micro program control system according to the present invention. In this control system, the timing of the data setting to the address register 59 is improved. As shown in FIG. 7, this embodiment sets the address information to the address register at the trailing or falling edge of the timing pulse signal $T_1$, so that the address register 59 can receive new address data at the same time as the supplying of a new micro instruction to the control register 53.

In this case, it becomes impossible for the address register 59 to take a new address from the contents of the control register 53, for example, at times $t_0$, $t_5$, and $t_8$ in FIG. 7, in view of the period of time required for data transfer therebetween. The contents of the instruction register 7 becomes also unusable to the address register at time $t_3$ in FIG. 7, for example, for the same reason as above.

According to the control system shown in FIG. 6, these problems have been overcome as follows. The address designated by the contents of the address field of the micro instruction is transferred to the address register 59 through lines 57C branched away from the lines 103 before the micro instruction is applied to the control register 53. The address selection code of the micro instruction is also transferred over lines 110 to the gate 55 before the micro instruction is applied to the control register 53. Furthermore, the decoder 56, which serves to decode the operation code of the macro instruction in order to specify the address of a second micro instruction to be executed after the first micro instruction, is connected directly to the data lines 5 in order to decode the operation code of the macro instruction without waiting for the completion of the macro instruction retrieval cycle.

In this manner, when the micro instruction 30 is applied to the control register 53 at time $t_0$, the address of the micro instruction X applied to the address register 59 is set at the same time. It will be understood that the first micro instruction 32 is reproduced by the micro instruction X and a binary pattern transferred from the subsidiary control memory 51 similarly to the case described in FIG. 5, and applied thereafter to the control register 53 at time $t_3$. When the macro instruction appears on the data lines 5, since the address appointing the next micro instruction 32 immediately appears on the lines 57B through the decoder 56, the address applied to the address register 59 is set at the same time $t_3$.

Upon the completion of the micro operation according to the micro instruction 31, the next micro instruction 32 is read out from the control memory 50. At the same time when this micro instruction 32 apapears on the lines 103, the contents of the address field and the address selection code of the micro instruction 32 are transferred to the address selector 57 respectively, so that the address of the next micro instruction 33 can be set into the address register 59 at time $t_5$. When the micro instruction 33 is read out from the control memory 50 at time $t_8$, the process of address setting for the next micro instruction X is performed similarly to that for the micro instruction 33.

As described above, according to the present invention, since the first micro instruction to be executed just after the fetching of each macro instruction is set in the control memory quickly, the time period required for the execution of respective micro programs is shortened by a time corresponding to the decoding cycle of the operation code of the macro instruction required for the previous control system.

Having described two embodiments of an improved micro program control system in accordance with the present invention, it is believed obvious that other modifications, variations, and changes will be apparent to those skilled in the art. That is, the substantial advantages of the present invention will not be lost, for example, in a case where the micro instruction X comprising an all zero bit pattern is read out synchronously with the first micro instruction stored in the subsidiary control memory for the convenience of circuit design. It is therefore to be expressly understood that any such modifications and changes that come within the spirit of the invention as defined by the scope of the appended claims are intended to be covered.

What is claimed is:

1. A micro program control system for use in a data processing system which effects data processing along with a sequence of macro instructions stored in a main memory by fetching these macro instructions one by one and storing in an instruction register, the micro program control system comprising:

control register means for holding a micro instruction for supplying control signals to said data processing system wherein said control signals correspond to the contents of the micro instruction;

subsidiary control memory, connected to said control register means, for storing the first micro instructions of respective micro programs;

control memory means, connected to said control register means, for storing the second and the remaining micro instructions of the respective micro programs;

first addressing means, connected to said control memory means, said instruction register and said control register means; said first addressing means responsive to the contents of said control register means, for successively addressing said control memory means to read out the second and the remaining micro instructions of a micro program corresponding to the macro instruction in the instruction register into said control register means; and second addressing means, connected between said main memory and said subsidiary control memory means for addressing said subsidiary conntrol memory to read out the first micro instruction into said control register means in response to the contents of the operation code of the macro instruction read out from said main memory.

2. A micro program control system as defined in claim 1, wherein said first addressing means comprises:

address register means connected to said control memory means for holding the address of a micro instruction to be read out from the control memory means;

address selector means connected to the address register means for updating the contents of the address register means;

decoder means connected to said instruction register for decoding the operation code of the macro instruction held in said instruction register to supply first address information to said address selector means;

means for incrementing the address value indicated by the address register means to supply second address information to said address selector means;

means for supplying third address information represented by the micro instruction in said control register means to said address selector means; and said address selector means selecting an address signal from among the first, second and third address information provided thereto in response to the contents of the control register means, thereby to supply the address to said address register means.

3. A micro program control system as defined in claim 2, wherein the operation code of the macro instruction includes a first operation code field for indicating the type of micro instruction format, and a second operation code field for indicating the type of operation in the data processing system, with the macro instruction being fetched from said main memory and stored in said instruction register, said second addressing means being coupled with a portion of said data lines, through which the first operation code field of the macro instruction is transferred, thereby addressing the first micro instruction corresponding to the contents of the first operation code field of the macro instruction.

4. A micro program control system for use in a data processing system which effects data processing along with a sequence of macro instructions stored in a main memory by fetching these macro instructions one by one and storing in an instruction register, the micro program control system comprising:

control register means for holding a micro instruction for supplying control signals to said data processing system wherein said control signals correspond to the contents of the micro instruction;

subsidiary control memory means connected to the control register for storing the first micro instructions of the respective micro programs, one of the micro instructions having a particular bit pattern which comprises zero value bits for the most part and unique value bits for the remaining part, and the bit pattern of the first micro instructions omitting such bits that correspond to the unique value bits of the micro instruction in a control memory means;

said control memory means connected to said control register for storing the second and remaining micro instructions of respective micro programs;

first adddressing means connected to said control memory means, said instruction means and said control register means, responsive to the contents of said instruction register and to the contents of said control register means for successively addressing said control memory means to read out one of the micro instructions of a micro program, corresponding to the macro instruction in the instruction register, into said control register means, said first addressing means supplying the micro instruction having the particular bit pattern to said control register means in synchronism with the reading out of the macro instruction from the main memory; and second addressing means connected between said main memory and said subsidiary control memory means for addressing said subsidiary control memory means to read out the first micro instruction into said control register means in response to the contents of the operation code of the macro instruction read out from the main memory.

5. A micro program control system as defined in claim 4, wherein said first addressing means comprises:

address register means connected to said control memory means for holding the address of a micro instruction to be read out from the control memory means;

address selector means connected to said address register means for updating the contents of the address register means;

decoder means connected to said instruction register for decoding the operation code of the macro instruction held in said instruction register for supplying first address information to said address selector means;

means for incrementing the address value indicated by the address register means for supplying second address information to said address selector means;

means for supplying said third address information, represented by the micro instruction in said control register means, to said address selector means; and said address selector means selecting an address signal from among the first, second and third address information provided thereto in response to the contents of said address register means, thereby to supply the address to said address register means.

* * * * *